(12) United States Patent
Kunin et al.

(10) Patent No.: US 6,281,255 B1
(45) Date of Patent: Aug. 28, 2001

(54) METHODS FOR REGENERATION OF WEAKLY BASIC ANION EXCHANGE RESINS WITH A COMBINATION OF AN ALKALI METAL CARBONATE AND AN ALKALI METAL BICARBONATE

(75) Inventors: Robert Kunin, Trenton, NJ (US); Peter A. Yarnell, Sellersville, PA (US); Nichole L. Pennisi, Newark, DE (US)

(73) Assignee: Graver Technologies, Inc., Glasgow, DE (US)

( * ) Notice: Subject to any disclaimer, the term of this patent is extended or adjusted under 35 U.S.C. 154(b) by 0 days.

(21) Appl. No.: 09/588,408

(22) Filed: Jun. 6, 2000

(51) Int. Cl.⁷ ..................................... B01J 49/00
(52) U.S. Cl. ........................ 521/26; 525/361; 525/362; 525/366; 525/367
(58) Field of Search ................................ 521/26

(56) References Cited

U.S. PATENT DOCUMENTS

| | | |
|---|---|---|
| Re. 29,680 | 6/1978 | Salem et al. . |
| 4,151,079 | 4/1979 | Horembala . |
| 4,184,948 | 1/1980 | Dabby et al. . |
| 4,299,922 * | 11/1981 | Holl ........................................ 521/26 |
| 4,687,582 * | 8/1987 | Dixon ................................... 210/677 |
| 4,988,738 * | 1/1991 | Mitschker .............................. 521/30 |
| 5,306,400 * | 4/1994 | Bradbury ............................ 204/101 |
| 5,352,345 | 10/1994 | Byszewski et al. . |
| 6,066,259 * | 5/2000 | Viscardi ................................ 210/682 |

* cited by examiner

Primary Examiner—Fred Zitomer
(74) Attorney, Agent, or Firm—Rockey, Milnamow & Katz L.t.d.

(57) ABSTRACT

Regeneration of weakly basic anion exchange resins with a combination of an alkali metal carbonate and an alkali metal bicarbonate is disclosed. Preferably, the alkali metal is sodium. The combination can be naturally available sodium sesquicarbonate.

9 Claims, No Drawings

METHODS FOR REGENERATION OF WEAKLY BASIC ANION EXCHANGE RESINS WITH A COMBINATION OF AN ALKALI METAL CARBONATE AND AN ALKALI METAL BICARBONATE

FIELD OF THE INVENTION

This invention is directed generally to the regeneration of weakly basic anion exchange resins with a combination of an alkali metal carbonate and an alkali metal bicarbonate. Preferably, the alkali metal is sodium. The combination can be naturally available sodium sesquicarbonate.

BACKGROUND OF THE INVENTION

Resin-type ion exchange devices have many uses such as the residential or industrial softening of water, deionization of sugar compounds, treatment of industrial waste or process waters and processing of protein complexes. As the fluid to be processed is passed through a vessel containing an ion exchange resin, ions in the fluid to be processed are exchanged with ions found in the resin, thereby removing objectionable ions from the fluid and exchanging them for less objectionable ions found in the resin. As this process progresses, the ability of the resin to exchange ions is gradually reduced. That is, as the resin captures the objectionable ions and releases the less objectionable ions, its capacity to continue this exchange process is gradually exhausted. Eventually, a steady state is reached in which no further objectionable ions in the fluid to be processed can be exchanged for the less objectionable ions found in the resin.

At this point, the ion exchange resin may be regenerated by chemically removing the objectionable ions from the resin and replacing these with the less objectionable ions. This regeneration process requires the suspension of the ion exchange exhaustion process (often referred to as the service cycle). During regeneration, a substance having a high concentration of the less objectionable ions is applied to the ion exchange resin. Because this produces a new balance of concentrations between the respective ions, the ion exchange resin now exchanges the objectionable ions captured during the service cycle for the less objectionable ions applied during regeneration. As a result of this process, the ability of the ion exchange resin to remove objectionable ions from the fluid to be processed is restored.

Weakly basic anion exchange resins, useful for neutralization of acidic aqueous streams, are conventionally regenerated with solutions of sodium hydroxide. For example, anion exchange resins may be regenerated by alkali metal hydroxides as disclosed in U.S. Pat. Re 29,680 or U.S. Pat. No. 4,151,079. However, use of such regenerants in the regeneration cycle may lead to a variation in pH for the solution eluted from the resin over time during the service cycle. If neutralization is incomplete, and the effluent is of low pH, corrosion of pipes further in the system may occur, while if the neutralization is incomplete and the pH of the effluent is high, precipitation may occur further in the system. Moreover, it may be undesirable to discard such regenerants once they have been used for regeneration, so they must be recycled for reuse, such as by electrodialysis as disclosed in U.S. Pat. No. 5,352,345. This recycling will undesirably increase the cost of the neutralization system.

Alternatively, if the ion exchange resin is thermally regenerable, countercurrent thermal regeneration may be utilized to regenerate the resin as disclosed in U.S. Pat. No. 4,184,948, avoiding use of chemical regenerants, but at greater cost.

Therefore, there is a need for an alternative method which allows efficient regeneration without increasing cost, or producing spent regenerants which cannot easily be discarded.

It is an object of this invention to provide a method for regenerating weakly basic anionic resins without increasing cost, or producing spent regenerants which cannot easily be discarded.

BRIEF SUMMARY OF THE INVENTION

The invention is directed to a method for regenerating a spent weakly basic anion exchange resin comprising the step of contacting said resin with a regenerant dosage of a combination of an alkali metal carbonate and an alkali metal bicarbonate, to obtain a regenerated weakly basic anion exchange resin.

For the practice of this aspect of the invention, an aqueous fluid influent may pass through the regenerated weakly basic anion exchange resin, the fluid influent having a pH of from about 3.0 to about 6.5. Moreover, an aqueous fluid effluent may elute from said regenerated weakly basic anion exchange resin, the fluid effluent having a pH of from about 6.5 to about 7.5. The influent may be industrial water or residential water.

The invention is also directed to a method for partial deionization of and neutralization of an impure fluid to remove calcium ions, magnesium ions and bicarbonate ions from said fluid with a weakly acidic cation exchange resin and neutralization of said fluid with a weakly basic anion exchange resin comprising the steps of:

a) passing said impure fluid through said weakly acidic cation exchange resin to remove said calcium ions, said magnesium ions and said bicarbonate ions, eluting a partially deionized acidic fluid;

b) passing said partially deionized acidic fluid continuously through said weakly basic anion exchange resin, eluting a deacidified fluid;

c) recovering said deacidified fluid;

d) regenerating said weakly basic anion exchange resin periodically by contacting said resin with a regenerant dosage of a combination of an alkali metal carbonate and an alkali metal bicarbonate, and regenerating said weakly acidic cation exchange resin periodically by contacting said resin with a regenerant dosage of citric acid; and then, e) repeating steps a) through d).

The partially deionized acidic fluid may have a pH of from about 3.0 to about 6.5; and the deacidified fluid may have a pH of from about 6.5 to about 7.5. The impure fluid may be industrial water or residential water. Moreover, in the method, the weakly acidic cation exchange resin and the weakly basic anion exchange resin may be layered in a single column, or each resin may be in a separate column.

For the practice of either method, the alkali metal carbonate may be sodium carbonate and said alkali metal bicarbonate may be sodium bicarbonate; a presently preferred combination is an alkali metal sesquicarbonate, such as sodium sesquicarbonate, potassium sesquicarbonate or a combination thereof; a presently preferred weakly basic anion exchange resin is an acrylate resin, although a styrenic weakly basic anion resin may also be utilized; and the resin may also be contacted said with a co-regenerant, a surfactant or a sequestering agent.

DETAILED DESCRIPTION OF THE INVENTION

Weakly Basic Anion Exchange Resins

A general description of ion exchange is found in *The Encyclopedia of Chemical Technology,* 3rd Edition, John Wiley & Sons, New York, 1981, vol. 13, pages 678–705. Weakly basic anion exchange resins possess a primary, secondary, or most commonly, a tertiary amine functionality. Acrylic weakly basic resins constitute a subgroup of this type of ion exchange resin. Instead of the more common aromatic benzene ring linkage between the polymer backbone and the functionality, acrylic weakly basic resins utilize aliphatic amide linkages. These aliphatic linkages confer unique properties to the acrylic weakly basic resins. One such key property is $pK_b$ (the ionization constant). As the $pK_b$ increases, the basic strength of the anion exchange resin decreases, $pK_b$ values for the acrylic weakly basic resins measure 5.5 to 6.0, whereas values for styrenic and other weakly basic resins exceed 7.0. Thus, the acrylic weakly basic anion exchangers are sufficiently basic to form a salt with carbon dioxide (present in water as carbonic acid) but not with silica (present as silicic acid). Other weakly basic resins do not form salts with either common weak acid. In addition, the relatively higher basicity aids in the removal of humic acids during the deionization process as well as elution of same during the regeneration process.

The anionic exchange resins used for the practice of the methods disclosed herein are gel type AMBERLITE Acrylic Anion Exchange resins such as AMBERLITE IRA 67, available from Rohm & Haas, referred to as acrylate resins herein. Styrenic resins such as DUOLITE A-392S, also available from Rohm & Haas may also be utilized.

The resins may be loaded into vertical columns, or beds. More than one weakly basic column may also be utilized. Moreover, the weakly basic resin may be layered under a weakly acidic cationic resin within a single column.

The Weakly Acidic Cation Exchange Resins

Weakly acidic cation exchange resins contain carboxylate functionality. Although weakly acidic resins can be made from a host of raw materials, most commercial resins are derived from either acrylic or metlhacrylic acid. Many of the desirable properties of the weakly acidic resins are directly related to their acidity or acid strength. For example, these resins can be regenerated very efficiently with only a slight stoichiometric excess of acid. Almost any acid, including carbon dioxide, will regenerate weakly acidic resins. Even waste acid is acceptable as long as the proper quantity is used. In addition, the weakly acidic resins exhibit exceptionally strong affinity for hydrogen ions and consequently, have negligible capacities below pH 4. Moreover, they have unusually high selectivities for divalent cations ($Ca^{++}$, $Mg^{++}$, $Cu^{++}$) over the monovalent cations ($Na^+$, $K^+$, $NH_4^+$) when operated in neutral or slightly basic media. The acidity of weakly acidic resins typically is expressed in tens of the apparent ionization constant ($K_a$) or more commonly the negative logarithm of this constant, $pK_a$. This apparent acidity increases with increased electrolyte concentration, decreased cross-linking and increased valence number of the cation. Moreover, methacrylic acid based resins are less acidic than their acrylic acid counterparts.

The most prevalent use of weakly acidic cation exchangers in water treatment involves dealkalization, the removal or destruction of alkalinity. The term alkalinity normally refers to the bicarbonate anion ($HCO_3^-$); however, the term may also include the carbonate ($CO_3^{-2}$) and hydroxide ($OH^-$) anions.

The weakly acidic resins remove both alkalinity and hardness ions simultaneously as noted in the following equation:

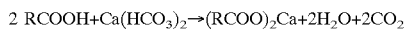

$$2\ RCOOH + Ca(HCO_3)_2 \rightarrow (RCOO)_2Ca + 2H_2O + 2CO_2$$

In this reaction, the formation of the undesirable free mineral acidity is minimal and regeneration of the weakly acidic resin is easily accomplished as noted above.

The Regenerants

Regeneration of an ion exchange resin involves removal of contaminants from ion exchange sites and the restoration of these sites to their original ionic (chemical) form. Generally, a chemical such as an acid or a base is used as the regenerant. The regenerant dosage is the quantity of the chemical needed to accomplish this removal and restoration. Regenerant dosages vary with the level of contaminant loading on ion exchange resin, the concentration of the chemical used, the temperature of the regenerant and numerous other factors. Generally, practical regenerant dosages remove most of the contaminants, but not all, due to the economics of the operation.

The regenerant for the weakly basic anion resin is a combination of an alkali metal carbonate and an alkali metal bicarbonate. A presently preferred alkali metal carbonate is sodium carbonate and a presently preferred alkali metal bicarbonate is sodium bicarbonate. The two components can be mixed together and treated concurrently during the regeneration cycle. Alternatively, a naturally available combination may be utilized, such as sodium sesquicarbonate, a double salt of sodium carbonate and sodium bicarbonate, of the formula $Na_2CO_3 \cdot NaHCO_3 \cdot 2H_2O$. The compound is a naturally occurring mineral, which is the raw material for soda ash. Sodium sesquicarbonate is supplied by FMC Corp. under the trade name SESQUI. SESQUI contains approximately 47% $Na_2CO_3$, 37% $NaHCO_3$ and 16% water of hydration.

For regeneration purposes, natural or synthetic sodium sesquicarbonate may be utilized. Other alkali metal sesquicarbonates, such as potassium sesquicarbonate may also be utilized. Moreover, combinations of sesquicarbonates may be utilized. The regenerants of the present invention may be utilized in the methods in either solid or liquid initial physical form.

The regenerants of the present invention may be treated in conjunction with addition of other chemicals. Co-regenerants such as potassium acetate or potassium formate; anionic or non-ionic surfactants; or sequestering agents such as citric acid, aminocarboxylic acid derivatives, amino phosphonates or gluconic acid, may be added to the system to be treated. These chemicals may be added simultaneously with, before or after the regenerants of the present invention, and more than one may also be added.

The Method

Many of the water supplies in the coastal areas of the U.S. as well as the water supplies near coal deposits and the waters near mining operations are plagued with acidic pH. These waters pose corrosion, taste, staining and odor problems. The typical treatment of acidic water is a two-step process involving passing the water through a column of limestone, followed by a column of a water softening resin which is regenerated with brine (NaCl). This procedure increases the total dissolved solids (TDS) level of the water as well as the cost of the treatment, and it does not remove the organics (TOC) normally present in acidic waters.

A novel regeneration procedure permits removal of the acidity from acid waters using a single column of weakly basic anion exchange resin which also removes major portions of TOC and nitrates as well as some of the arsenic. Whereas the two-stage system increases the TDS, the new system decreases the TDS as well as major quantities of the objectionable TOC, nitrates and arsenates.

Deionization, sometimes called demineralization, involves total removal of dissolved ionic species, both cations and anions. Certain ion exchange resins such as mixed beds of strongly acidic cation and strongly basic anion resin perform deionization of water.

Partial deionization is similar to deionization except that only certain, specific dissolved ionic species are removed by the ion exchange resin(s). For instance, a weakly acidic cation resin removes both hardness (calcium and magnesium) and an equivalent amount of bicarbonate (alkalinity) ions from feed water. This dual removal process lowers the total dissolved solids in the effluent; thus, the term partial deionization is applied to it.

In the context of ion exchange resins, the term "spent" is synonymous with exhausted. Resins are deemed spent or exhausted when contaminants from the feed water arc loaded on to all of the exchange sites on the resin. At that point, the ion exchange resin must be discarded and replaced with new resin or regenerated with an appropriate chemical that removes contaminants loaded on to the ion exchange sites.

We have found that certain regenerants are particularly useful in deacidification methods. Sodium sesquicarbonate, commonly referred to as trona, is used as the weakly basic anion exchange resin regenerant in the deacidification process. This chemical is essentially an equi-molar crystal of sodium bicarbonate and sodium carbonate. The sesquicarbonate is a naturally occurring mineral of high purity. This solid salt must be dissolved in water which also dilutes the concentration of the salt to the preferred range of 5 to 10% weight-by-weight. The dilute solution is then passed either downflow or upflow through the exhausted weakly basic resin. Optimal regeneration requires adequate contact time (thirty minutes or more) and moderate flow rates (typically four bed volumes per hour). During this process, resin sites loaded with chlorides, sulfates and nitrates during exhaustion are regenerated (displaced) with carbonates and bicarbonates from the sesquicarbonate. Since the required quantity of this regenerant is relatively small, the amount of sodium carried over into the waste regenerant is minor. At the conclusion of the regeneration, the resin is rinsed with water to remove residual sesquicarbonate and dissolved ions prior to returning the column to service.

The impure fluids to be treated can be either residential waters (water piped into the home) or industrial waters (water from chemical or mechanical production processes, waste water from various treatments, pulp and paper waste water, or mining waste water among others). The impure fluids may contain contaminants such as calcium ions, magnesium ions, bicarbonate ions, or other dissolved inorganic ions such as sodium, potassium, iron, silica, chloride, sulfate or nitrate among others.

The methods for regeneration of the present invention are described in detail hereinafter in the Examples. These Examples are presented to describe preferred embodiments and utilities of the invention and are not meant to limit the invention unless otherwise stated in the claims appended hereto.

EXAMPLE 1

To determine the effectiveness of sesquicarbonate for deacidification with weakly basic anionic exchange resins, the following experiments were performed. Glass columns having dimensions of 1.0 inch inner diameter and 48 inches length were utilized. The columns were fitted with retaining screens (300 micron nominal openings) and plastic endcaps for ion exchange resin retention during operation. Positive displacement pumps with continuously variable speed controls were used to deliver solution to the column from the appropriate reservoir. Ultra-pure water generated by multiple unit process equipment was used in all dilutions and rinses, as well as in subsequent analytical work. The feed stream for exhaustion was generated by passing tap water through a column of methacrylate weakly acidic cation exchange resin (Rohm & Haas AMBERLITE IRC-50) which had been regenerated with a stoichiometric amount of citric acid. The effluent stream was dealkalized and partially softened with a pH ranging from 3.9 to 6.0. Solution was collected, blended to achieve a pH of 4.4–4.6 and stored for later use.

Two gellular weakly basic anionic resins in the free base form (OH$^-$) were chosen for this study. AMBERLITE IRA-67 (Rohm & Haas) was the acrylate resin utilized, and DUOLITE A-392S (Rohm & Haas) was the styrenic resin utilized. Each resin was pre-conditioned via cycling (5% HCl/deionized water rinse/4% NaOH/ deionized water rinse) to remove residual manufacturing impurities. In the initial AMBERLITE IRA-67 trial, 90 mls of cycled resin was charged to the 0.6 inch glass column to yield a bed depth of 20 inches. In all subsequent trials using a 1.0 inch glass column, the resin charge was increased to 330 mls which yielded a 25 inch bed depth. Gentle backwashing after charging the resin classified the bed and removed any entrained air bubbles.

Each trial involved using the classified resin bed to treat the low pH (=4.5) water in a service (exhaustion) cycle. Both exhaustions and regenerations were done using downflow (co-current) flow through the resin bed at a rate of four bed volumes per hour (BV/h). Effluent pH was recorded periodically throughout the exhaustion. In addition, effluent conductivity was measured continuously through each trial.

Ten separate deacidification trials were undertaken. Seven of the trials involved the acrylic resin, AMBERLITE IRA-67, while three trials utilized the styrenic resin, DUOLITE A-392S. With the exception of the initial trial, a resin bed volume of 330 mls which corresponded to a bed depth of 25 inches was standard. Due to the smaller column size, the first trials involved only 90 mls of resin with 20 inches of bed depth. Initially, single trials were performed on the IRA-67 resin converted to the hydroxide, carbonate and bicarbonate forms respectively. In the second of these trials (results reported in Table 2), fresh hydroxide form IRA-67 was converted to the carbonate form using 5 liters of 1N (approximately 5%) Na$_2$CO$_3$ solution. In turn, after the subsequent exhaustion with low pH water, the resin was regenerated to the bicarbonate form using 5 liters of 1N(approximately 5%) NaHCO$_3$ prior to trial three (results reported in Table 3). In the fourth trial (results reported in Table 4), fresh hydroxide form IRA-67 was converted to a mixed carbonate/bicarbonate form using a 50:50 mixture of 1N Na$_2$CO$_3$ and 1N NaHCO$_3$. Subsequently, a fresh charge of hydroxide form IRA-67 regenerated with a naturally occurring sodium sesquicarbonate mixture known as trona at the dosage of 5 liters of 5% weight/weight of solution was tested (results reported in Table 5). The trona used for these trials was supplied by FMC under the trade name SESQUI. When the resin tested was hydroxide form DUOLITE A-392S, the resin bed was regenerated to the mixed carbonate/bicarbonate form in the same way as described above (results reported in Table 6).

Tables 1–6 indicate the results of the trials. In the Tables, pH is measured as a certain amount of fluid (as indicated by bed volumes) passes through the resin bed after a regeneration with the regenerant to be tested. If conventional bases, such as hydroxide, sodium bicarbonate or sodium carbonate, when utilized alone, were the regenerants, and the pH recorded during the service cycle for deacidification (after the regeneration cycle) was evaluated, it is clear that the resultant pH was either too high or too low as illustrated by Tables 1–3. Therefore none of hydroxide, sodium bicarbonate or sodium carbonate was an effective regenerant for neutralization.

Table 4 shows that use of a synthetic mix of sodium bicarbonate and sodium carbonate will provide a stable pH at neutral range. Table 5 indicates that addition of sodium sesquicarbonate (natural mix of sodium bicarbonate and sodium carbonate) results in stable pH at neutral range. The same resin was regenerated twice with sodium sesquicarbonate and similar results were obtained each time. Table 6 shows that for the styrenic resin either the synthetic mix or the sodium sesquicarbonate provides a stable pH subsequent to regeneration.

TABLE 1

Trial with NaOH Regenerant

| Bed Volumes | pH |
|---|---|
| 0.33 | 9.59 |
| 0.67 | 9.53 |
| 1 | 9.2 |
| 1.33 | 9.13 |
| 2 | 9.12 |
| 4 | 9.69 |
| 12 | 9.3 |
| 20 | 9.02 |
| 24 | 9.02 |
| 28 | 9 |
| 36 | 8.86 |
| 44 | 8.96 |
| 52 | 8.85 |
| 56 | 7.92 |
| 60 | 8.67 |
| 68 | 8.7 |
| 76 | 8.74 |
| 84 | 8.69 |
| 150 | 8.32 |
| 156 | 7.98 |
| 164 | 8.01 |

TABLE 2

Trial with $Na_2CO_3$ Regenerant

| Bed Volumes | pH |
|---|---|
| 0.33 | 7.15 |
| 0.67 | 9 |
| 1 | 9.44 |
| 1.33 | 9.59 |
| 2 | 9.7 |
| 4 | 9.92 |
| 12 | 9.75 |
| 20 | 9.67 |
| 84 | 9.27 |

TABLE 3

Trial with $NaHCO_3$ Regenerant

| Bed Volumes | pH |
|---|---|
| 0.33 | 5.02 |
| 0.67 | 5.02 |
| 1 | 5.06 |
| 1.33 | 5.45 |
| 2 | 5.87 |
| 4 | 6.02 |
| 12 | 6.11 |
| 20 | 6.23 |
| 28 | 6.42 |
| 36 | 6.71 |
| 44 | 6.7 |
| 52 | 6.68 |
| 60 | 6.24 |
| 68 | 6.49 |
| 76 | 6.4 |
| 144 | 6.29 |
| 152 | 6.36 |
| 160 | 6.42 |
| 168 | 6.47 |
| 176 | 6.45 |
| 200 | 6.5 |
| 208 | 6.5 |
| 216 | 6.55 |
| 224 | 6.3 |
| 232 | 6.55 |
| 248 | 6.53 |
| 256 | 6.58 |
| 324 | 6.65 |
| 332 | 6.33 |
| 352 | 6.68 |
| 420 | 6.32 |
| 428 | 6.45 |
| 444 | 6.33 |
| 512 | 6.63 |
| 566 | 6.6 |
| 584 | 6.5 |
| 648 | 6.5 |
| 744 | 6.24 |
| 840 | 6.59 |
| 936 | 5.45 |
| 956 | 6.3 |

TABLE 4

Trial with 1:1 $Na_2CO_3/NaHCO_3$ Regenerant

| Bed volumes | pH |
|---|---|
| 0.33 | 5.89 |
| 0.67 | 5.46 |
| 1 | 5.69 |
| 1.33 | 6.47 |
| 2 | 6.74 |
| 4 | 6.77 |
| 8 | 6.71 |
| 12 | 6.72 |
| 20 | 6.55 |
| 28 | 6.58 |
| 40 | 6.59 |
| 60 | 6.54 |
| 72 | 6.47 |
| 80 | 6.48 |
| 96 | 6.54 |
| 104 | 6.55 |
| 112 | 6.59 |
| 132 | 6.56 |
| 140 | 6.5 |
| 152 | 6.49 |
| 160 | 6.49 |
| 176 | 6.45 |
| 166 | 6.59 |
| 196 | 6.65 |

TABLE 4-continued

Trial with 1:1 Na₂CO₃/NaHCO₃ Regenerant

| Bed volumes | pH |
|---|---|
| 204 | 6.9 |
| 228 | 6.54 |
| 236 | 6.6 |
| 256 | 6.7 |
| 288 | 6.6 |
| 296 | 6.67 |

TABLE 5

Trial with Sodium Sesquicarbonate Regenerant

| Bed Volumes | pH |
|---|---|
| 0.33 | 6.9 |
| 0.67 | 7.1 |
| 1 | 7.2 |
| 2 | 7.1 |
| 4 | 7.5 |
| 12 | 7.3 |
| 20 | 7.4 |
| 28 | 7.4 |
| 92 | 6.3 |
| 100 | 6.8 |
| 108 | 7.1 |
| 116 | 7.1 |
| 124 | 6.9 |
| 190 | 6.6 |
| 200 | 6.9 |
| 208 | 7.2 |
| 220 | 7.1 |

TABLE 6 pH Obtained by Treatment with Regenerants of Styrenic Resins

| Bed Volumes | Treatment A[1] | Treatment B[2] | Treatment C[3] |
|---|---|---|---|
| 0.33 | 9.07 | 7.1 | 6.9 |
| 1 | 6 | 7.2 | 6.2 |
| 2 | 7.23 | 7.5 | 6.9 |
| 4 | 7.4 | 7.8 | 6.9 |
| 8 | 7.33 | 7.7 | 6.9 |
| 12 | 7.19 | | |
| 16 | 7.25 | | |
| 20 | | | 6.9 |
| 24 | 6.95 | | |
| 28 | | | 7.2 |
| 32 | 6.89 | | |
| 44 | 6.95 | | |
| 64 | 6.9 | | |
| 70 | | 6.9 | |
| 76 | 6.9 | 7.4 | |
| 84 | 6.95 | 7.4 | |
| 92 | | 7.5 | 6.2 |
| 100 | 6.95 | 8.7 | 6.8 |
| 104 | | 8.6 | |
| 108 | 6.94 | | |
| 116 | 6.95 | 6.5 | |
| 126 | | | 6.3 |
| 136 | 6.95 | | |
| 144 | 6.99 | | |
| 156 | 6.99 | | |
| 164 | 6.89 | | |
| 168 | | 9.1 | |
| 180 | 6.99 | 9.4 | |
| 188 | | 9.5 | 6.1 |
| 192 | 8.25 | | |
| 198 | | | 6.5 |
| 200 | 9.16 | 9.2 | |
| 208 | 9.25 | | |
| 212 | | | 6.9 |
| 216 | | | 7 |
| 224 | | | 6.8 |
| 232 | 9.21 | | |
| 240 | 9.18 | | |
| 260 | 8.65 | | |
| 264 | | 8.6 | |
| 272 | | 8.4 | |
| 280 | | 8.5 | |
| 286 | | | 7 |
| 288 | | 8.5 | |
| 292 | 8.55 | | |
| 296 | | 8.4 | |
| 300 | 8.66 | | |
| 306 | | | 8.3 |
| 308 | 8.76 | | |
| 312 | | | 8.4 |
| 316 | 8.69 | | |
| 358 | | 7.2 | |
| 372 | | 7.4 | |
| 392 | | 6.6 | |

[1] = 50:50 solution of Na₂CO₃/NaHCO₃, first cycle
[2] = 50:50 solution of Na₂CO₃/NaHCO₃, second cycle
[3] = Sodium sesquicarbonate

EXAMPLE 2

The utility of the sesquicarbonate regenerant, in a system wherein both deacidification and partial deionization of the fluid to be treated was required, was tested in the following manner.

The regenerants of the present invention were tested at a Northeastern water processing facility. Two resin beds in a co-current regeneration system were utilized to treat tap water as follows. The first resin bed was a methacrylic weakly acidic cationic resin. City tap water was fed to the cation resin after rough filtration with a string wound cartridge to remove sediment and particulate matter. The first, cationic, bed removed dissolved solids (cations) from the feed water. Consequently, calcium, magnesium and iron were exchanged for hydrogen ions, and so the pH of the effluent from the cationic column was acidic (pH=4.0–4.8). The weakly acidic cationic resin was not able to remove monovalent cations such as sodium or potassium. The second resin bed, which was weakly basic, was utilized to remove salts of strong mineral acids. Therefore, chloride, sulfate, nitrate as well as organics in the influent to the anionic resin bed were exchanged for carbonate and bicarbonate ions, so that the effluent aqueous solution from the anionic resin bed was largely neutralized. When necessary, the run was stopped and the anionic resin was regenerated with an appropriate amount of sodium sesquicarbonate. The anionic resin was then rinsed prior to a return to service.

In addition to monitoring of pH throughout the experiment, total dissolved solids leakage and flow rate (measured in gallons per minute or gpm) were measured during each run. At the end of each run, the weakly acidic cation resin was regenerated with a stoichiometric quantity of citric acid. Table 7 illustrates that the acidic effluent from the first cationic bed is effectively neutralized by the anionic resin bed in the service cycle following a regeneration with the regenerant sodium sesquicarbonate.

TABLE 7

Two Resin Bed Trial

| Cationic Resin Effluent pH | Anionic Resin Effluent pH | Flow Rate (gpm) |
|---|---|---|
| 4.16 | 6.75 | 4 |
| 4.01 | 7 | 4 |
| 4.11 | 6.84 | 4 |
| 4.08 | 6.86 | 4 |
| 4.13 | 6.88 | 4 |
| 4.1 | 6.89 | 4 |
| 4.08 | 6.95 | 5 |
| 4.1 | 6.91 | 5 |
| 4.14 | 6.9 | 5 |
| 4.14 | 6.9 | 5 |
| 4.2 | 6.99 | 4 |
| 4.2 | 6.96 | 4 |
| 4.2 | 6.9 | 4 |
| 4.21 | 6.9 | 4 |
| 4.25 | 6.97 | 4 |
| 4.22 | 6.9 | 4 |
| 4.31 | 6.99 | 4 |
| 4.36 | 7.14 | 4 |
| 4.42 | 7.08 | 4 |
| 4.42 | 7.14 | 4 |
| 4.42 | 7.14 | 5 |
| 4.43 | 7.24 | 4 |
| 4.37 | 7.07 | 4 |
| 4.45 | 7.14 | 4 |
| 4.48 | 7.14 | 4 |
| 4.5 | 7.17 | 4 |
| 4.41 | 7.05 | 4 |
| 4.45 | 7.05 | 4 |
| 4.44 | 7.24 | 4 |
| 4.5 | 7.15 | 4 |
| 4.46 | 7.1 | 4 |
| 4.5 | 7.05 | 3 |
| 4.57 | 7.25 | 3 |
| 4.5 | 7.1 | 4 |
| 4.67 | 7.12 | 4 |
| 4.62 | 7.28 | 4 |
| 4.65 | 7.1 | 4 |
| 4.66 | 7.1 | 4 |
| 4.79 | 7.27 | 4 |
| 4.8 | 7.1 | 4 |
| 4.88 | 7.1 | 4 |

EXAMPLE 3

An acrylic weakly acidic cation resin in the hydrogen form was utilized in a dealkalization experiment. Initially, the resin was cycled through exhaustions and regenerations. The final regeneration utilized a stoichiometric quantity (64.04 g/equivalent) of citric acid.

A synthetic feed water was created using laboratory tap water spiked with sodium bicarbonate to generate a hardness-to-alkalinity (H/A) ratio of <1. The tap water contained 44 ppm as $CaCO_3$ of hardness and 30 ppm as $CaCO_3$ of alkalinity (H/A=1.6). After the sodium bicarbonate addition, the target levels in the feed water were 44 ppm as $CaCO_3$ of hardness and 48 ppm as $CaCO_3$ of alkalinity (H/A =0.92).

During exhaustion, the synthetic feed water was fed to the weakly acidic resin column at a rate of 16 bed volumes/hour (2 gpm/ft$^3$). The exhaustion continued overnight without attention, but was discontinued over the weekend due to limited feed water reservoir volume (five separate synthetic feed solutions were made up during the course of the experiment). In addition to hardness and alkalinity, conductivity, temperature and pH were measured periodically throughout the exhaustion. Table 8 summarizes the data recorded. The exhaustion was terminated when hardness leakage exceeded 20% of the feed concentration.

The effluent from the weakly acidic cation column was collected and stored for use as the feed for deacidification using an acrylic weakly basic anion resin in the sesquicarbonate form. It is evident that both hardness and alkalinity of the impure feed water were reduced.

TABLE 8

| Time (hours) | Throughput (bed volumes) | pH | Hardness | Alkalinity |
|---|---|---|---|---|
| Feed 1 | | | | |
| 0 Effluent | 0 | 5.5 | 44 | 48 |
| 0.08 | 1.33 | 5 | 0 | 6 |
| 0.33 | 5.33 | 3.2 | 0 | 0 |
| 0.5 | 8 | 3.4 | 0 | 0 |
| 1 | 16 | 3.5 | 0 | 0 |
| 2 | 32 | 3.7 | 0 | 0 |
| 3 | 48 | 4 | 0 | 8 |
| 4 | 64 | 4.1 | 0 | 8 |
| 6 | 96 | 4.1 | 0 | 8 |
| 22 | 352 | 4.2 | 2 | 10 |
| 28 | 448 | 4.4 | 2 | 14 |
| 30 | 480 | 4.4 | 2 | 14 |
| Feed 2 | | | | |
| 46 Effluent | 736 | — | 44 | 50 |
| 46 | 736 | 4.5 | 6 | 14 |
| 51 | 816 | 4.7 | 6 | 14 |
| 54 | 864 | 4.5 | 6 | 16 |
| Feed 3 | | | | |
| 54 Effluent | 864 | — | 42 | 44 |
| 69.5 | 1112 | 4.9 | 6 | 16 |
| 75 | 1200 | 5.2 | 6 | 16 |
| 78 | 1248 | 5.2 | 6 | 16 |
| Feed 4 | | | | |
| 81 Effluent | 1296 | — | 42 | 48 |
| 81 | 1296 | 5.2 | 6 | 16 |
| 84 | 1344 | 5.3 | 6 | 16 |
| 101 | 1616 | 5.3 | 8 | |
| 104 | 1664 | 5.3 | 8 | 18 |
| Feed 5 | | | | |
| 106 Effluent | 1696 | — | 42 | 44 |
| 107 | 1712 | 5.4 | 8 | 18 |
| 123.5 | 1976 | 5.3 | 8 | 18 |
| 126.5 | 2024 | 5.9 | 10 | 20 |

All references cited are hereby incorporated by reference.

The present invention is illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

Changes can be made in the composition, operation and arrangement of the method of the present invention described herein without departing from the concept and scope of the invention as defined in the following claims.

We claim:

1. A method for regenerating a spent weakly basic anion exchange resin comprising the step of contacting said resin with a regenerant dosage of a combination of an alkali metal carbonate and an alkali metal bicarbonate, to obtain a regenerated weakly basic anion exchange resin.

2. The method of claim 1 wherein said alkali metal carbonate is sodium carbonate and said alkali metal bicarbonate is sodium bicarbonate.

3. The method of claim 1 wherein said combination is an alkali metal sesquicarbonate.

4. The method of claim 3 wherein said alkali metal sesquicarbonate is selected from the group consisting of sodium sesquicarbonate, potassium sesquicarbonate and a combination thereof.

5. The method of claim 1 wherein an aqueous fluid influent passes through said regenerated weakly basic anion exchange resin, said fluid influent having a pH of from about 3.0 to about 6.5.

6. The method of claim 5 wherein an aqueous fluid effluent elutes from said regenerated weakly basic anion exchange resin, said fluid effluent having a pH of from about 6.5 to about 7.5.

7. The method of claim 5 wherein said influent is industrial water or residential water.

8. The method of claim 1 wherein said weakly basic anion exchange resin is an acrylate resin or a styrenic resin.

9. The method of claim 1 further comprising contacting said spent weakly basic anion exchange resin with a co-regenerant, a surfactant or a sequestering agent.

* * * * *

UNITED STATES PATENT AND TRADEMARK OFFICE
CERTIFICATE OF CORRECTION

PATENT NO.    : 6,281,255 B1
DATED         : August 28, 2001
INVENTOR(S)   : Robert Kunin et al.

It is certified that error appears in the above-identified patent and that said Letters Patent is hereby corrected as shown below:

Column 3,
Line 50, delete "tens" and replace with -- terms --

Column 12,
Line 43, in Table 8, under fifth column labeled Alkalinity, insert -- 18 --

Signed and Sealed this

Twenty-sixth Day of February, 2002

Attest:

JAMES E. ROGAN
Director of the United States Patent and Trademark Office

Attesting Officer